(No Model.)
R. L. WILLIS.
WATER GAGE.
No. 311,093. Patented Jan. 20, 1885.
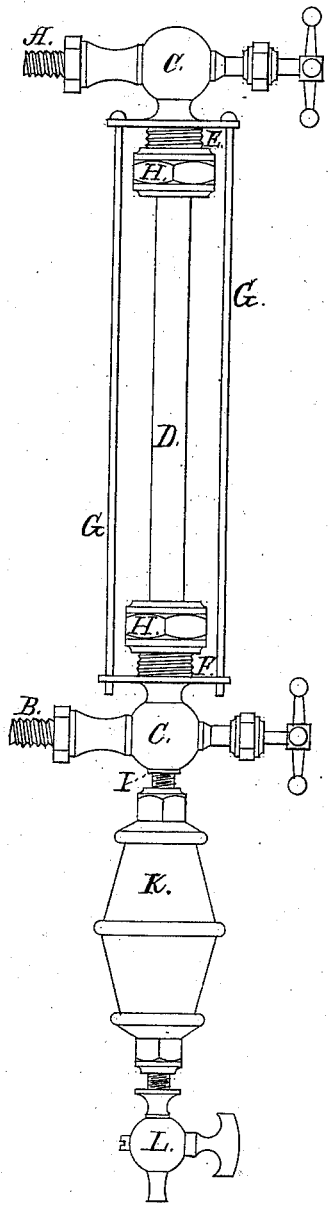
Witnesses:
Nat Gunter,
R. R. Dixon.
Inventor.
Robt. L. Willis
Per Z. P. Dederick.
Attorney.

UNITED STATES PATENT OFFICE.

ROBERT L. WILLIS, OF SHERMAN, TEXAS.

WATER-GAGE.

SPECIFICATION forming part of Letters Patent No. 311,093, dated January 20, 1885.

Application filed September 5, 1884. (No model.)

*To all whom it may concern:*

Be it known that I, ROBERT L. WILLIS, a citizen of the United States, residing at Sherman, in the county of Grayson and State of Texas, have invented a new and useful Improvement in Water-Gages, of which the following is a specification.

My invention consists in the arrangement of a chamber attached to the lower valve of an ordinary water-gage; and the object of my improvement is to prevent the foam and sediment of steam-boilers from accumulating in the glass, stuffing-boxes, and valves of water-gages. I attain this object by the mechanism illustrated in the accompanying drawing, in which the figure is a vertical elevation of the entire device.

A and B are pins projecting from the sides of ordinary gage-valves, C C. They screw into the shell of a boiler, and by which the gage is attached thereto. Through the former steam and through the latter water passes into the glass tube D, which is suitably secured at each end in hollow chambers E and F. These tubes are flanged. Said flanges serve for holding guard-rods G.

H H are stuffing-boxes, in which there is suitable packing to secure the ends of the glass tube D.

A petcock is usually placed in the aperture I at the bottom end of valve C, intended for the purpose of blowing out any sediment or dirty water which may accumulate in the glass or valves of the water-gage. This cock I remove, and in its place screw the hollow chamber K, at the bottom end of which I screw the cock L, removed from the valve. This chamber acts as a repository for any sediment or lime which may enter the glass or valves. The sediment tends to settle downward into this chamber, when it may be readily and frequently blown out through the cock L. By means of this attachment the glass and valves are always kept clear of lime or other deposit which rapidly accumulates in ordinary gages. Should this chamber become coated with lime, as it will in the course of time, it may be removed, cleaned, and replaced, when it will act as effectually as when new.

By proper use of this device it is never necessary to remove and clean the glass or valves, thus rendering the breaking of glasses much less frequent.

Having fully described my invention, what I desire to claim and secure by Letters Patent is—

A glass water-gage having attached to the lower valve, C, thereof a receptacle or chamber, K, to receive foreign matter, and provided with a blow-out cock, L, at its lower end for relieving said receptacle of said matter, as shown and described.

ROBERT L. WILLIS.

Witnesses:
NAT GUNTER,
R. R. DIXON.